United States Patent
Connor et al.

(10) Patent No.: US 12,032,356 B2
(45) Date of Patent: *Jul. 9, 2024

(54) METHOD AND SYSTEM FOR AUTOMATED TOOLPATH GENERATION

(71) Applicant: Mantle Inc., San Francisco, CA (US)

(72) Inventors: Stephen T. Connor, San Francisco, CA (US); Alex S. Goldenberg, San Francisco, CA (US); Jonathan Hsu, San Francisco, CA (US); Benjamin D. Voiles, San Francisco, CA (US); Theodore Charles Sorom, San Francisco, CA (US)

(73) Assignee: Mantle Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,746

(22) Filed: Apr. 19, 2023

(65) Prior Publication Data

US 2023/0251626 A1    Aug. 10, 2023

Related U.S. Application Data

(63) Continuation of application No. 17/862,650, filed on Jul. 12, 2022, now Pat. No. 11,662,711, which is a (Continued)

(51) Int. Cl.
*G05B 19/4099* (2006.01)
*B33Y 50/02* (2015.01)

(52) U.S. Cl.
CPC .......... *G05B 19/4099* (2013.01); *B33Y 50/02* (2014.12); *G05B 2219/35134* (2013.01); *G05B 2219/49007* (2013.01)

(58) Field of Classification Search
CPC ...... B22F 10/20; B22F 10/10; B22F 2998/10; B22F 10/40; B22F 3/26; B22F 2998/00;
(Continued)

(56) References Cited

U.S. PATENT DOCUMENTS

| | | | |
|---|---|---|---|
| 4,552,719 A | 11/1985 | Morimoto et al. |
| 4,596,746 A | 6/1986 | Morishita et al. |

(Continued)

FOREIGN PATENT DOCUMENTS

| | | |
|---|---|---|
| EP | 1724716 A1 | 11/2006 |
| EP | 2443640 B1 | 10/2014 |

(Continued)

OTHER PUBLICATIONS

Ader, C., et al., "Research on Layer Manufacturing Techniques at Fraunhofer", Fraunhofer Institute for Laser Technology ILT, Aachen, Germany, pp. 26-37, Aug. 4, 2004., Nov. 9, 2017 00:00:00.0.
(Continued)

*Primary Examiner* — Darrin D Dunn
(74) *Attorney, Agent, or Firm* — Jeffrey Schox; Randy Mehlenbacher

(57) ABSTRACT

A method for facilitating part fabrication, such as by automated toolpath generation, can include one or more of: receiving a virtual part; modifying the virtual part; and/or determining toolpaths to fabricate the target part. The toolpaths preferably define an ordered series of additive and subtractive toolpaths, more preferably wherein the additive and subtractive toolpaths are interleaved, which can function to achieve high manufacturing efficiency and/or performance. The method can additionally or alternatively include: generating machine instructions based on the toolpaths; fabricating the target part based on the machine instructions; calibrating the fabrication system; and/or any other suitable elements.

19 Claims, 8 Drawing Sheets

Related U.S. Application Data continuation of application No. 16/697,034, filed on Nov. 26, 2019, now Pat. No. 11,422,532, which is a continuation of application No. 16/417,279, filed on May 20, 2019, now Pat. No. 10,520,923.

(60) Provisional application No. 62/675,073, filed on May 22, 2018.

(58) Field of Classification Search
CPC ......... B22F 10/30; B33Y 10/00; B33Y 30/00; B33Y 50/02; B33Y 80/00; G05B 2219/35134; G05B 2219/49013; G05B 2219/35016; G05B 2219/49021; G05B 2219/49023; G05B 2219/49024; G05B 2219/49039
See application file for complete search history.

(56) References Cited

U.S. PATENT DOCUMENTS

| | | |
|---|---|---|
| 5,207,371 A | 5/1993 | Prinz et al. |
| 5,398,193 A | 3/1995 | DeAngelis et al. |
| 5,514,232 A | 5/1996 | Burns |
| 5,732,323 A | 3/1998 | Nyrhila |
| 6,207,300 B1 | 3/2001 | Koch et al. |
| 6,438,250 B1 | 8/2002 | Johannet |
| 6,471,800 B2 | 10/2002 | Jang et al. |
| 6,602,766 B2 | 8/2003 | Chang et al. |
| 6,630,009 B2 | 10/2003 | Moussa et al. |
| 6,974,656 B2 | 12/2005 | Hinczewski |
| 7,003,864 B2 | 2/2006 | Dirscherl |
| 7,070,734 B2 | 7/2006 | Liu et al. |
| 8,361,924 B2 | 1/2013 | Tanaka et al. |
| 8,838,419 B2 | 9/2014 | Sullivan et al. |
| 8,983,805 B2 | 3/2015 | Rameau et al. |
| 9,153,355 B2 | 10/2015 | Choi et al. |
| 9,190,187 B2 | 11/2015 | Song et al. |
| 9,409,244 B2 | 8/2016 | Geiser |
| 9,434,109 B2 | 9/2016 | Ding |
| 9,751,260 B2 | 9/2017 | Dietrich et al. |
| 9,757,902 B2 | 9/2017 | Sparks et al. |
| 9,849,019 B2 | 12/2017 | Miller et al. |
| 10,111,753 B2 | 10/2018 | Patterson et al. |
| 10,130,378 B2 | 11/2018 | Bryan |
| 10,220,566 B2 | 3/2019 | Bauza et al. |
| 10,259,158 B2 | 4/2019 | Leu et al. |
| 10,315,252 B2 | 6/2019 | Symeonidis et al. |
| 10,315,357 B2 | 6/2019 | Riman |
| 2002/0072205 A1 | 6/2002 | Chang et al. |
| 2002/0129485 A1 | 9/2002 | Mok et al. |
| 2002/0149137 A1 | 10/2002 | Jang et al. |
| 2002/0176793 A1 | 11/2002 | Moussa et al. |
| 2003/0175621 A1 | 9/2003 | Hinczewski |
| 2003/0204286 A1 | 10/2003 | Thomas et al. |
| 2004/0107019 A1 | 6/2004 | Keshavmurthy et al. |
| 2004/0217095 A1 | 11/2004 | Herzog |
| 2004/0241585 A1 | 12/2004 | Kato et al. |
| 2006/0083652 A1 | 4/2006 | Liu et al. |
| 2007/0241482 A1 | 10/2007 | Giller et al. |
| 2008/0233416 A1 | 9/2008 | Takase |
| 2009/0110307 A1 | 4/2009 | Markowitz |
| 2009/0174709 A1 | 7/2009 | Kozlak et al. |
| 2009/0189315 A1 | 7/2009 | Guenster et al. |
| 2010/0161105 A1 | 6/2010 | Blake |
| 2010/0194813 A1 | 8/2010 | Kritchman et al. |
| 2011/0068502 A1 | 3/2011 | Basseas |
| 2011/0213482 A1 | 9/2011 | Saarela et al. |
| 2012/0046164 A1 | 2/2012 | Tanaka et al. |
| 2012/0291701 A1 | 11/2012 | Grasegger et al. |
| 2013/0015609 A1 | 1/2013 | Landau |
| 2013/0119577 A1 | 5/2013 | You et al. |
| 2013/0124151 A1 | 5/2013 | Mech et al. |
| 2013/0134363 A1 | 5/2013 | Song et al. |
| 2013/0139873 A1 | 6/2013 | Choi et al. |
| 2013/0189435 A1 | 7/2013 | Mackie et al. |
| 2013/0209600 A1 | 8/2013 | Tow |
| 2013/0307175 A1 | 11/2013 | Tang |
| 2013/0311450 A1 | 11/2013 | Ramani et al. |
| 2014/0060633 A1 | 3/2014 | Lucas et al. |
| 2014/0129183 A1* | 5/2014 | Imamura ................ G06T 19/20 703/1 |
| 2014/0272121 A1 | 9/2014 | Ng et al. |
| 2014/0287583 A1 | 9/2014 | Liu et al. |
| 2014/0291886 A1 | 10/2014 | Mark et al. |
| 2014/0295199 A1 | 10/2014 | Baarman et al. |
| 2014/0309764 A1 | 10/2014 | Socha-Leialoha et al. |
| 2014/0349132 A1 | 11/2014 | Uhlmann et al. |
| 2015/0061170 A1 | 3/2015 | Engel et al. |
| 2015/0076739 A1 | 3/2015 | Batchelder |
| 2015/0134095 A1 | 5/2015 | Hemani et al. |
| 2015/0174658 A1 | 6/2015 | Ljungblad |
| 2015/0197063 A1 | 7/2015 | Shinar et al. |
| 2015/0380272 A1 | 12/2015 | Wu et al. |
| 2016/0031010 A1 | 2/2016 | O'Neill et al. |
| 2016/0059493 A1 | 3/2016 | Sparks et al. |
| 2016/0279882 A1 | 9/2016 | Davis et al. |
| 2016/0297097 A1 | 10/2016 | Riman |
| 2017/0087632 A1 | 3/2017 | Mark |
| 2017/0104225 A1 | 4/2017 | Barnwell et al. |
| 2017/0120527 A1 | 5/2017 | Miller et al. |
| 2017/0173870 A1 | 6/2017 | Condello et al. |
| 2017/0203515 A1* | 7/2017 | Bennett ................ B29C 64/393 |
| 2017/0209958 A1 | 7/2017 | Soshi |
| 2017/0217093 A1 | 8/2017 | Demuth et al. |
| 2017/0252169 A1 | 9/2017 | Alambeigi et al. |
| 2017/0312985 A1 | 11/2017 | Talgorn et al. |
| 2018/0071819 A1 | 3/2018 | Connor et al. |
| 2018/0072000 A1 | 3/2018 | Riemann |
| 2018/0111314 A1* | 4/2018 | Philippi ................ B33Y 10/00 |
| 2018/0154439 A1 | 6/2018 | Mark |
| 2018/0169953 A1 | 6/2018 | Matusik et al. |
| 2018/0193922 A1 | 7/2018 | Bell et al. |
| 2018/0194076 A1* | 7/2018 | Bell ..................... B29C 64/393 |
| 2018/0222110 A1 | 8/2018 | Batchelder |
| 2018/0229300 A1 | 8/2018 | Myerberg et al. |
| 2018/0250739 A1 | 9/2018 | Saurwalt et al. |
| 2018/0250774 A1 | 9/2018 | Symeonidis et al. |
| 2018/0276316 A1 | 9/2018 | Brochu et al. |
| 2018/0304273 A1 | 10/2018 | Myerberg et al. |
| 2018/0305266 A1 | 10/2018 | Gibson et al. |
| 2018/0307209 A1* | 10/2018 | Chin ..................... G06F 30/17 |
| 2018/0311891 A1* | 11/2018 | Duty ................... B29C 64/106 |
| 2018/0321659 A1 | 11/2018 | Dasappa et al. |
| 2018/0345376 A1 | 12/2018 | Page |
| 2018/0361668 A1 | 12/2018 | Kim et al. |
| 2019/0001412 A1 | 1/2019 | Gibson et al. |
| 2019/0002713 A1* | 1/2019 | Fong .................... B29C 64/112 |
| 2019/0003176 A1 | 1/2019 | Donelan et al. |
| 2019/0016904 A1 | 1/2019 | Connor et al. |
| 2019/0047047 A1 | 2/2019 | Mark |
| 2019/0061002 A1 | 2/2019 | Symeonidis et al. |
| 2019/0077098 A1 | 3/2019 | Riley et al. |
| 2019/0130642 A1 | 5/2019 | Elber et al. |
| 2019/0134914 A1* | 5/2019 | Gonzalez ............... G06F 30/20 |
| 2019/0143587 A1 | 5/2019 | Mamrak et al. |
| 2019/0152155 A1 | 5/2019 | Gonzalez et al. |
| 2019/0160595 A1 | 5/2019 | Narayanan et al. |
| 2019/0168300 A1 | 6/2019 | Gelbart |
| 2019/0168448 A1 | 6/2019 | Osiroff et al. |
| 2019/0184631 A1 | 6/2019 | Bauza et al. |
| 2019/0193159 A1 | 6/2019 | Gibson et al. |
| 2019/0224909 A1 | 7/2019 | Riha et al. |
| 2019/0255611 A1* | 8/2019 | Frank .................. B29C 64/209 |
| 2019/0329502 A1 | 10/2019 | Tobia et al. |
| 2020/0101534 A1 | 4/2020 | Gibson |
| 2020/0108445 A1 | 4/2020 | Yurko |
| 2020/0269320 A1 | 8/2020 | Ben-Zur et al. |
| 2020/0376755 A1* | 12/2020 | Hikmet ................ B29C 64/188 |
| 2020/0406557 A1* | 12/2020 | Gonzalez Martin ... B33Y 50/02 |
| 2021/0094102 A1 | 4/2021 | Lin et al. |

(56) References Cited

U.S. PATENT DOCUMENTS

2021/0138721 A1* 5/2021 Hikmet .................. B33Y 10/00
2022/0063185 A1* 3/2022 Isaki .................. B29C 65/1654

FOREIGN PATENT DOCUMENTS

| EP | 2902427 A1 | 8/2015 |
|---|---|---|
| EP | 3064556 | 9/2016 |
| WO | 200039358 | 7/2000 |
| WO | 2003084708 | 10/2003 |
| WO | 2017197361 A1 | 11/2017 |

OTHER PUBLICATIONS

Behandish, M., et al., "Automated Process Planning for Hybrid Manufacturing", Computer-Aided 10-11, 14-15, 21-22 Design (CAD). May 18, 2018.

Du, Wei, et al., "A Novel Method for Additive/Subtractive Hybrid Manufacturing of Metallic Parts", Procedia Manufacturing, vol. 5, pp. 1018-1030. Jan. 1, 2016.

Joseph, Flynn M, et al., "Hybrid additive and subtractive machine tools - Research and industrial developments", International Journal of Machine Tools and Manufacture, Elsevier, Amsterdam, NL, vol. 101, (Nov. 22, 2015), pp. 79-101, XP029360287, ISSN: 0890-6955, DOI: 10/1016/J.IJMACHTOOLS.2015.11.007.

Raghunath, N., et al., "Improving accuracy through shrinkage modelling by using Taguchi method in selective laser sintering", ScienceDirect, International Journal of Machine Tools & Manufacture 47 (2007) 985-995.

Zhu, Z., et al., "Application of a hybrid process for high precision manufacture of difficult to machine prismatic parts", The International Journal of Additive Manufacturing Technology, vol. 74, No. 5-8. Sep. 1, 2014.

* cited by examiner

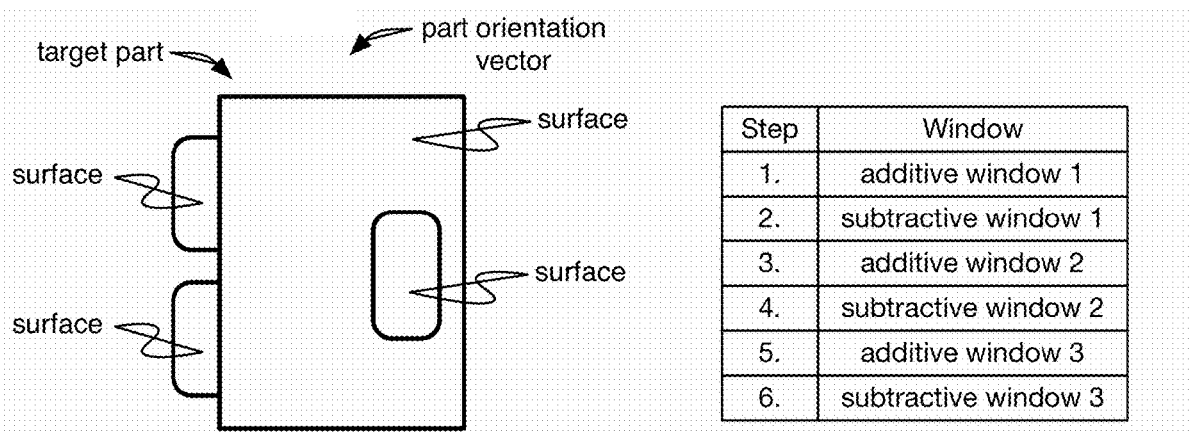
FIGURE 6A
FIGURE 6B
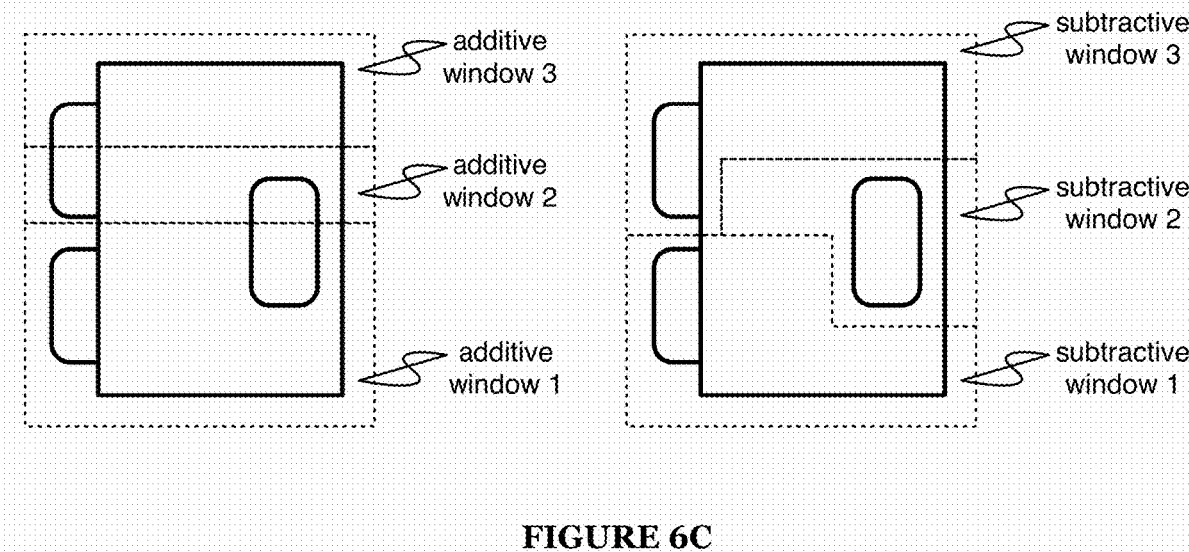
FIGURE 6C

METHOD AND SYSTEM FOR AUTOMATED TOOLPATH GENERATION

CROSS-REFERENCE TO RELATED APPLICATIONS

This application is a continuation of prior U.S. application Ser. No. 17/862,650, filed on 12 Jul. 2022, which is a continuation of prior U.S. application Ser. No. 16/697,034, filed on 26 Nov. 2019, which is a continuation of prior U.S. application Ser. No. 16/417,279, filed on 20 May 2019, which claims the benefit of U.S. Provisional Application Ser. No. 62/675,073, filed on 22 May 2018, each of which is incorporated in their entireties by this reference.

TECHNICAL FIELD

This invention relates generally to the part fabrication field, and more specifically to a new and useful method and system for automated toolpath generation in the part fabrication field.

BACKGROUND

Determination of toolpaths for part fabrication, especially fabrication by combined additive and subtractive fabrication techniques, can be a complex and/or time-consuming task. Further, such toolpaths may result in fabrication inefficiencies, such as time and/or material inefficiencies. Thus, there is a need in the part fabrication field to create a new and useful method and system for automated toolpath generation.

BRIEF DESCRIPTION OF THE FIGURES

FIG. 6A depicts a side view of an example of a target part.

FIGS. 6B-6C depict an example fabrication plan associated with the example of the target part.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
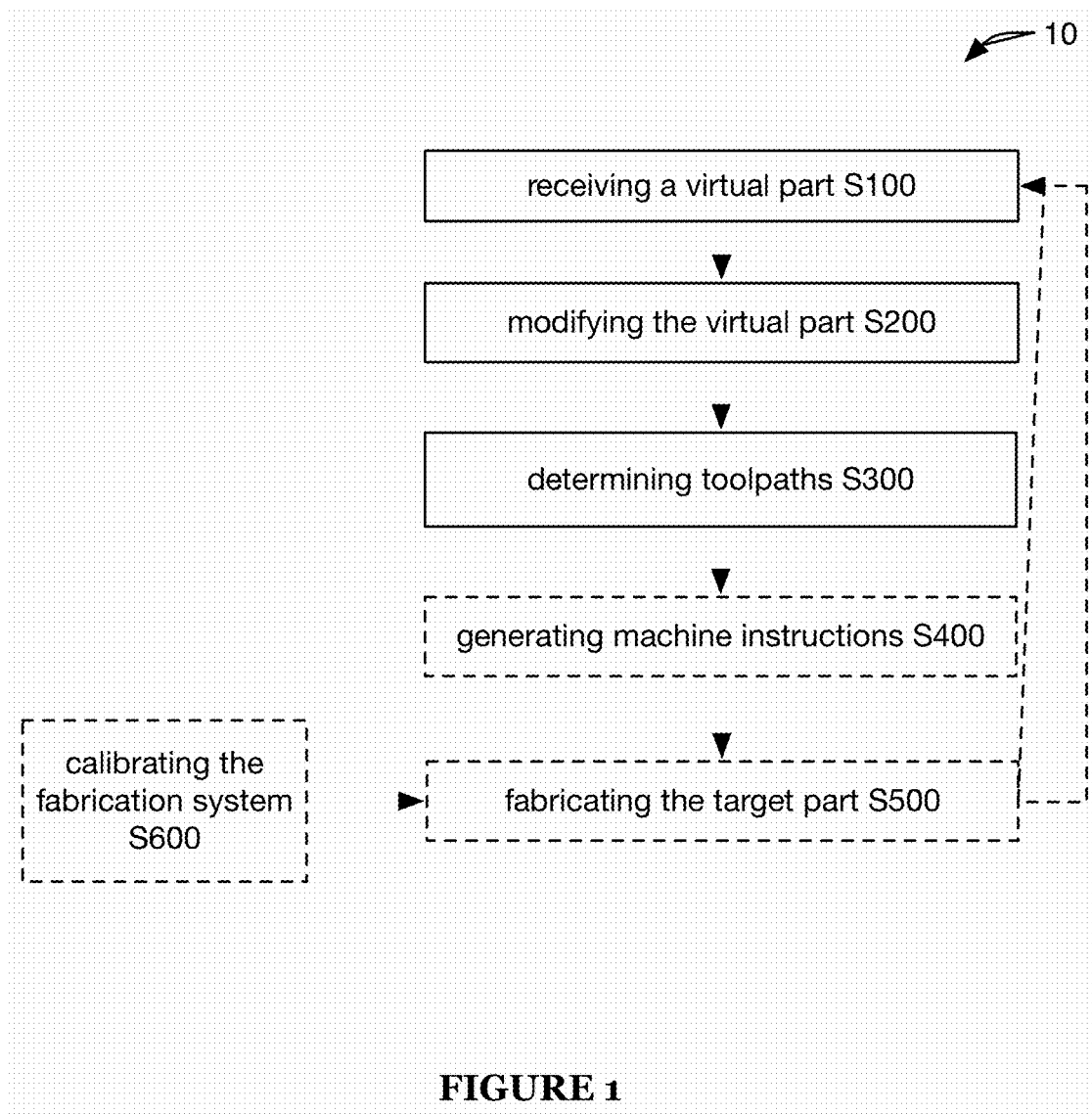
FIG. 1 is a flowchart representation of an embodiment of the method.

A method 10 for facilitating part fabrication (e.g., via automated toolpath generation) preferably includes (e.g., as shown in FIG. 1): receiving a virtual part S100; modifying the virtual part S200; and determining toolpaths to fabricate the target part S300. The method 10 can additionally or alternatively include: generating machine instructions based on the toolpaths S400; fabricating the target part based on the machine instructions S500; calibrating the fabrication system S600; and/or any other suitable elements.

The method 10 is preferably performed using a system 20 for automated toolpath generation and/or part fabrication. The system 20 preferably includes a computing system and/or a fabrication system, and can additionally or alternatively include any other suitable elements.

However, the method 10 can additionally or alternatively be performed using any other suitable system(s), and the system 20 can additionally or alternatively be used to perform any other suitable method(s).

2. Benefits

Embodiments of the method 10 and/or system 20 can confer a number of benefits. First, the method 10 and/or system 20 can function to achieve improved fabrication performance and/or efficiency (e.g., time and/or material efficiency). For example, in embodiments in which minimal additional material is deposited beyond the target part dimensions, material waste is reduced, and most subtractive fabrication time contributes directly to part finish, rather than rough material removal. Fewer cutting tools may be required, which can reduce tool change time during fabrication. Further (e.g., due to the application of subtractive fabrication techniques to green bodies rather than sintered materials or unitary metals), fast, high-quality material removal can be achieved, even using small cutting tools (e.g., endmills with diameters such as 0.010-0.050").

Second, embodiments of the method 10 and/or system 20 can enable an automated or semi-automated workflow. For example, input files (e.g., virtual parts) may not require human pre-processing, and no special skills or training (e.g., specific to the combined additive and subtraction techniques of the system) may be required. In some examples, no human intervention is required during performance of the method 10 (e.g., after receiving the virtual part S100, method elements such as all or any of S200-S600 can be performed autonomously). However, the method 10 and/or system 20 can additionally or alternatively confer any other suitable benefits.

3. System

The system 20 preferably includes a fabrication system (e.g., as described in U.S. patent application Ser. No. 15/705,548, entitled "System and Method for Additive Metal Manufacturing" and filed 15 Sep. 2017, which is hereby incorporated in its entirety by this reference), more preferably a system configured to perform both additive and subtractive fabrication tasks. The fabrication system preferably includes one or more: deposition mechanisms (e.g., including a print material dispenser, such as a needle or other nozzle), material removal mechanisms, and movement mechanisms, and can additionally or alternatively include any other suitable elements.

The fabrication system (e.g., the deposition mechanism) is preferably operable to fabricate metal parts by depositing precursor material such as a paste (e.g., as described is U.S. patent application Ser. No. 15/594,472, entitled "Sinterable Metal Paste for use in Additive Manufacturing" and filed 12 May 2017), preferably a binderless paste that forms a high-density green body. However, the deposition mechanism and/or other elements of the fabrication system can additionally or alternatively be operable to fabricate parts (e.g., metal parts) in any other suitable manner.

The material removal mechanism preferably includes one or more milling tools, and is preferably configured to automatically change between different milling tools (e.g., using an automatic tool changer). The milling tools can include, for example, end mills (e.g., square, radiused, ball, spherical, keyseat cutters, chamfering, etc.), fly cutters, facing tools, and/or any other suitable milling tools.

The movement mechanisms (e.g., translation mechanisms such as linear actuators, rotation mechanisms such as rotary actuators, etc.) are preferably mechanisms configured to reposition the manufactured part (e.g., during fabrication) relative to the deposition and/or material removal mechanisms (e.g., by moving the part, such as by moving a stage on which the part is supported and/or to which the part is affixed; by moving the deposition and/or material removal mechanisms; etc.). Motion of the movement mechanisms is preferably controlled electronically (e.g., CNC movement mechanisms) but can additionally or alternatively be controlled in any other suitable manner.

The system 20 preferably includes one or more computing systems (e.g., configured to communicate with and/or control operation of the fabrication systems, etc.). The computing systems can include computing devices integrated with (e.g., embedded in, directly connected to, etc.) the fabrication system(s), user devices (e.g., smart phone, tablet, laptop and/or desktop computer, etc.), remote servers (e.g., internet-connected servers, such as those hosted by a toolpath generation service provider and/or fabrication system manufacturer), and/or any other suitable computing systems.

However, the system 20 can additionally or alternatively include any other suitable elements in any suitable arrangement.

4. Method 4.1 Receiving a Virtual Part.

Receiving a virtual part S100 preferably functions to determine parameters of the part to be fabricated (e.g., for which fabrication toolpaths should be generated). The virtual part is preferably a computer representation of a physical object, such as a CAD file (e.g., file in a format such as STEP, STL, etc.). The virtual part is preferably received by the computing system. The virtual part can be received from another computing system, from a virtual parts database, from a user (e.g., using a CAD application running on the computing system), from a set of one or more sensors (e.g., 3D scanning system), and/or from any other suitable entities. However, the virtual part can additionally or alternatively be received in any other suitable manner.

4.2 Modifying the Virtual Part.

Modifying the virtual part S200 preferably functions to adapt the received virtual part (the original part) for fabrication. S200 is preferably performed by the computing system (and/or another computing system), and is preferably performed in response to receiving the virtual part S100, but can additionally or alternatively be performed by any suitable entity or entities with any suitable timing.

S200 optionally includes determining a part orientation. The orientation can be an orientation associated with the original part or can be determined based on fabrication criteria. In a first example, a broad face of the part is selected as a bottom face (e.g., wherein a vertical axis orientation is defined as normal to the bottom face and/or a vertical position is defined as zero at the bottom face), which can facilitate fixturing and/or adhesion to the fabrication system stage. In a second example, a concave surface is selected as an upward-facing surface (e.g., wherein no other portion of the part is above the concave surface), which can reduce overhanging features, thereby facilitating subtractive fabrication processes. However, the orientation can be selected in any suitable manner.

S200 preferably includes compensating for fabricated part shrinkage and/or deformation (e.g., caused by post-fabrication processing, such as sintering), thereby generating a target part (e.g., target part to be fabricated in S500) based on the original part. For example, the original part can be scaled up (e.g., uniformly, such as by a predefined factor; non-uniformly, such as based on shrinkage modeling; etc.) to generate the target part.

S200 preferably includes expanding features of the part along one or more dimensions (e.g., width, height, etc.), thereby generating an oversize part, preferably based on the target part, but alternatively based on the original part and/or any other suitable virtual part. The oversize part can function as a target for additive fabrication (e.g., target for fabrication in the absence of any subtractive fabrication). Such expansion can allow for consistent material removal during subtractive fabrication (e.g., ensuring good surface finish, reducing and/or eliminating exterior voids, etc.).

Expanding the features can include, for example, expanding each feature of the part in all lateral directions (e.g., all directions normal to a layering axis, such as a vertical axis, all directions contained within a plane, such as an additive slice, etc.) and/or expanding each feature of the part in the vertical direction by a height expansion constant (e.g., predetermined constant, such as 5-75 µm, 5-75% of the deposition layer thickness, etc.). In some examples, one or more negative part features (e.g., pockets and/or holes, such as small-diameter holes) may shrink to zero or near-zero size by this expansion; such negative features that would shrink to near-zero size (e.g., defining a dimension, such as width or depth, below a threshold value) can optionally instead by shrunk to zero size (e.g., wherein additional subtractive fabrication will be used to achieve the desired feature).

Figure 7A:
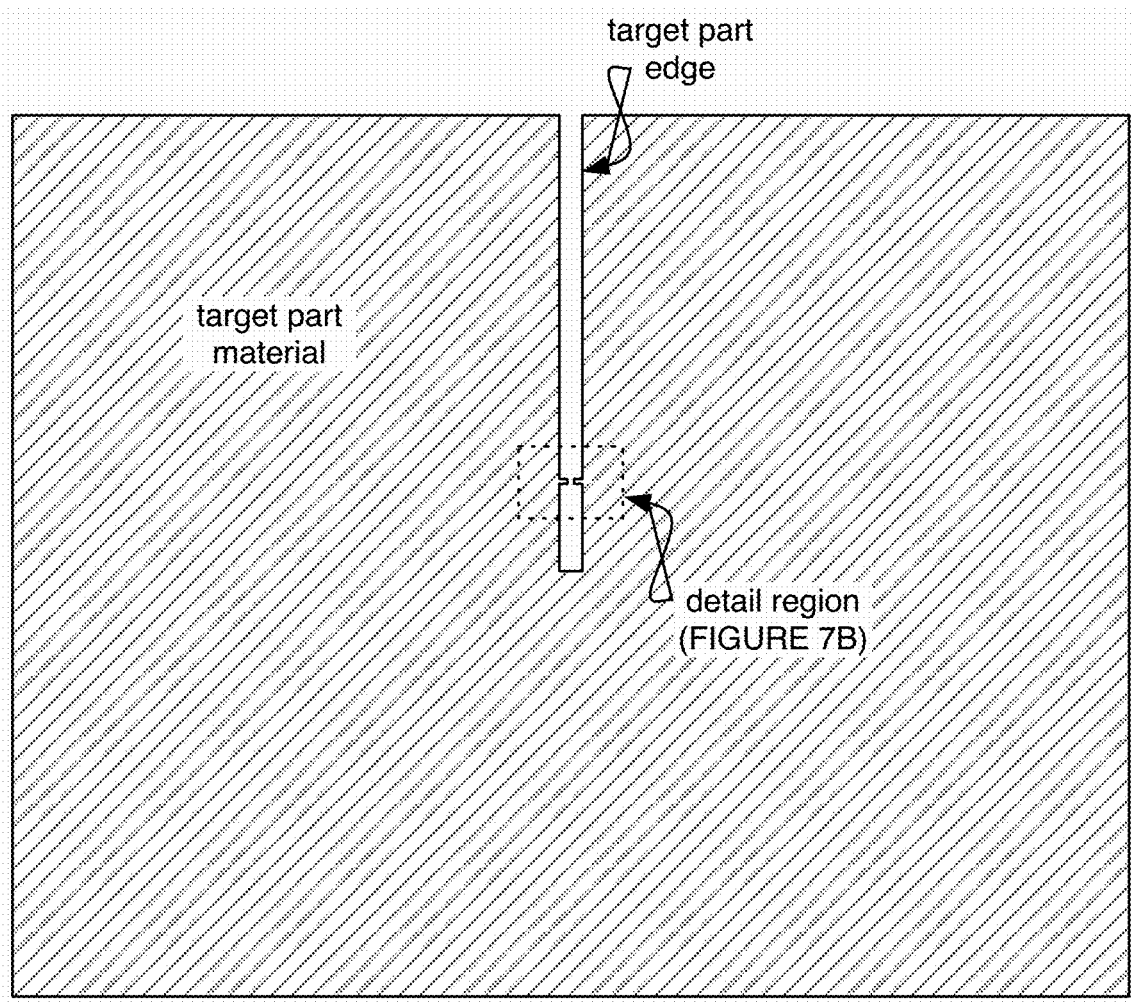
FIG. 7A depicts a cross-sectional view, normal to a part orientation vector, of a target part.
Figure 7B:
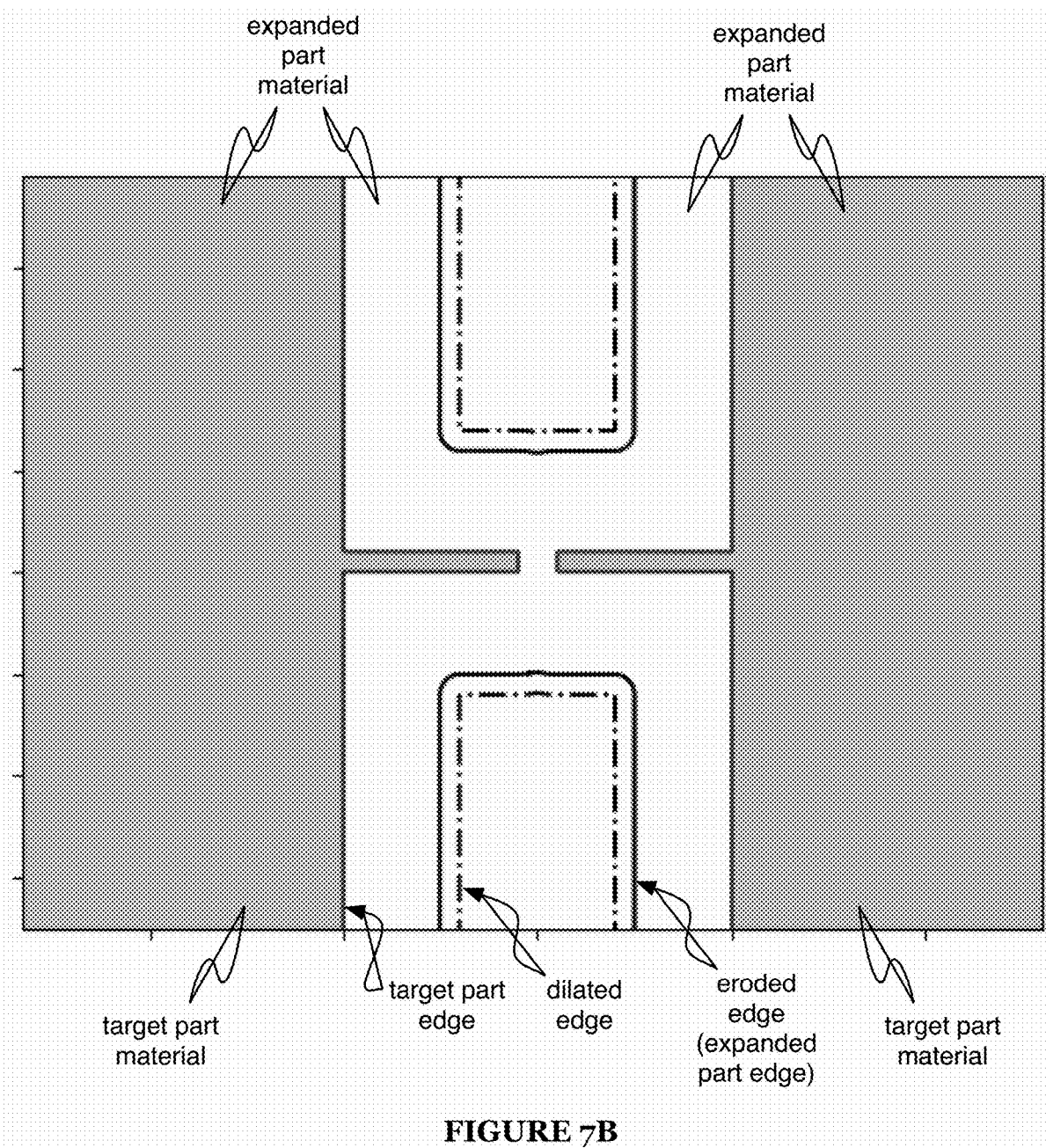
FIG. 7B depicts a detail region of the cross-sectional view of the target part of FIG. 7A, superimposed on a dilated part and a dilated-and-eroded part.

In a first embodiment, this expansion is achieved through one or more dilation operations. A dilation operation results in a dilated shape, defined as the shape that would be formed by tracing a dilation tool (e.g., a circle, sphere, cylinder, etc.) along the exterior surface of the original shape (the shape being dilated, such as the target part), wherein the dilated shape is equal to the union of the original shape and the entire volume traced by the dilation tool. The dilation tool can have a predetermined size (e.g., diameter), such as 50-750 µm or 5-75% of the deposition road width, can have a dynamically-determined size (e.g., determined based on the part geometry), and/or can have any other suitable size. In one variation of this embodiment, the dilation operation(s) are followed by one or more erosion operations, wherein the exterior surfaces of the dilated shape are moved inward by a fixed distance (preferably by less than the size of the dilation tool, such as 10-90% of the dilation tool size), such as shown by way of example in FIGS. 7A-7B. In a second embodiment, this expansion is achieved by expanding each feature of the part in all lateral directions by a width expansion constant (e.g., predetermined constant, such as 50-750 µm, 5-75% of the deposition road width, etc.). However, the part can additionally or alternatively be expanded in any other suitable manner.

S200 can optionally include adding support features to the part(s) (e.g., to the original part, target part, oversize part, etc.). The support features can function to support high aspect ratio and/or overhanging part features, form molds for part features, and/or provide any other suitable functions. The support features can be determined before determining toolpaths to fabricate the target part S300 (e.g., performed concurrently with and/or immediately following other aspects of S200), can be determined concurrent with S300 (e.g., concurrent with S320), and/or can be determined at any other suitable time.

S200 can optionally include identifying regions (e.g., volumes) that can and/or will be modified to reduce their density (e.g., for the purpose of lightweighting the part), such as by dispensing infilled regions at less than 100% infill and/or not filling the regions. Lightweighting can function, for example, to speed print time and/or conserve material. Such volumes can be identified manually (e.g., by a user and/or designer), such as being specified in the received virtual part, can be automatically identified (e.g. as a function of allowable distance from surface), and/or can be identified in any other suitable manner. In response to identification of such volumes, S200 preferably includes modifying the virtual part such that all or some of the identified volumes include no infill and/or only partial infill (e.g. 15, 25, 35, 45, 50, 55, 65, 75, 85, 0-15, 15-40, 40-60, 60-85, or 85-100% infill, etc.).

The support features preferably correspond to structures to be fabricated (e.g., via additive fabrication) using one or more support materials (e.g., as described in U.S. patent application Ser. No. 15/705,548, entitled "System and Method for Additive Metal Manufacturing" and filed 15 Sep. 2017, which is hereby incorporated in its entirety by this reference) different from the primary material (e.g., material used to fabricate the target part, such as a metal paste), such as wherein the support material can be removed (e.g., by melting, dissolution, decomposition, evaporation, mechanical removal, etc.) after fabrication of the structures it supports. However, the support features can additionally or alternatively be fabricated using the primary material (e.g., wherein the support features are removed by subtractive fabrication techniques after fabrication of the structures they support, wherein the support features are not removed, etc.).

However, S200 can additionally or alternatively include any other suitable elements performed in any suitable manner.

4.3 Determining Fabrication Toolpaths.

Figure 2:
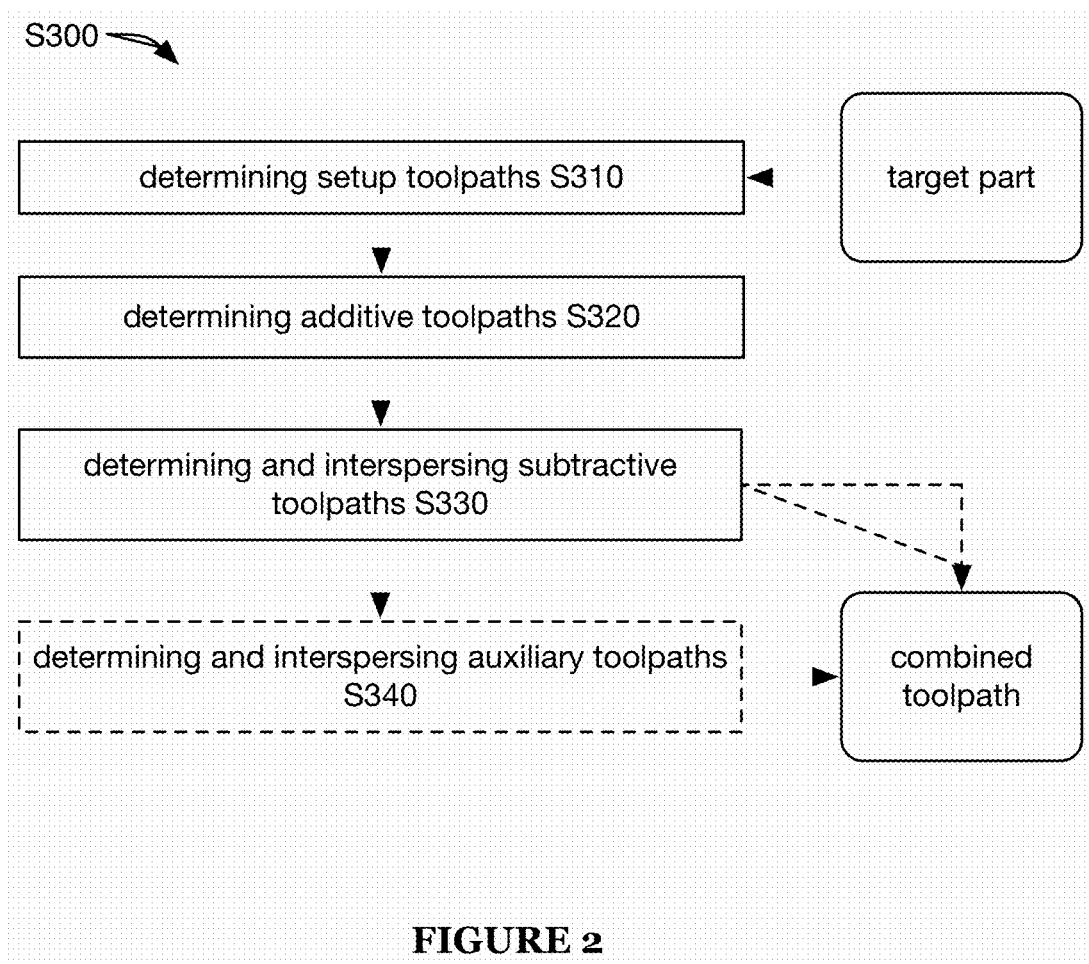
FIG. 2 is a flowchart representation of an embodiment of determining toolpaths.

Determining toolpaths to fabricate the target part S300 preferably functions to generate efficient toolpaths for the fabrication system. S300 preferably includes determining additive toolpaths S320 and determining and interspersing subtractive toolpaths S330 (e.g., as shown in FIG. 2). S300 can optionally include determining setup toolpaths S310, determining and interspersing auxiliary toolpaths S340, and/or any other suitable elements. S300 is preferably performed after (e.g., in response to) S200, but can additionally or alternatively be performed at any other suitable time.

Determining setup toolpaths S310 preferably functions to generate toolpaths associated with preparing a fabrication system stage (e.g., bed) for part fabrication. The setup toolpaths can include additive toolpaths (e.g., depositing primary and/or support material on which the part can be fabricated, preferably to create a flat horizontal surface for deposition; depositing adhesive material to affix the part during fabrication, etc.), subtractive toolpaths (e.g., facing the stage and/or deposited material, or a portion thereof, such as to create a flat horizontal surface for deposition), and/or any other suitable toolpaths. Such setup toolpaths can function to compensate for non-planarity and/or misalignment of the stage, non-linearity and/or other defects (e.g., leading to a reduction in accuracy of the gantry), and/or any other suitable aspects of the fabrication system.

Determining additive toolpaths S320 preferably functions to generate material deposition toolpaths (e.g., corresponding to the oversize part). S320 preferably includes determining additive volumes (e.g., additive slices) and determining additive toolpaths for each volume, and can additionally or alternatively include determining support material toolpaths and/or any other suitable elements.

Determining additive volumes preferably includes slicing the part (e.g., the oversize part) horizontally, but can additionally or alternatively include slicing the part vertically and/or at an oblique angle (e.g., to the vertical axis), defining volumes with non-planar boundaries, and/or separating the part into any other suitable volumes (preferably a set of volumes that collectively span the entire part, more preferably being substantially mutually non-overlapping). The volumes are preferably parallel to each other (e.g., and regularly spaced), but can alternatively have any suitable relative orientations. Each volume preferably corresponds to a single deposition layer, but can alternatively correspond to multiple deposition layers. The slices preferably have equal thicknesses (e.g., equal to the deposition layer thickness, preferably accounting for additional material in the deposited layer that can be removed by subtractive machining, such as an additional 5-150 µm), but the slice thickness can additionally or alternatively be dynamically determined (e.g., thickness proportional to the lowest sidewall slope of a slice and/or group of slices, thickness altered to compensate for overhang features, etc.). For example, slice thickness (and/or deposition layer thickness) can be reduced for slices that include printing overhangs (e.g., wherein one or more roads of the deposition layer include printing material not entirely supported by the deposition layer below), which can help achieve greater printing fidelity (e.g., avoiding deformation of printed material due to surface tension effects, such as movement of printed material away from the overhanging edge). In specific examples, the deposition layer thickness and/or slice thickness can be 5, 10, 20, 30, 40, 50, 60, 70, 75, 80, 85, 90, 95, 100, 105, 110, 120, 150, 3-10, 10-30, 30-60, 60-75, 75-100, 100-130, and/or 130-200 µm, but can additionally or alternatively include any other suitable thicknesses.

Determining additive toolpaths for each volume (e.g., slice) preferably functions to determine paths (e.g., lateral and/or substantially lateral paths) for filling the desired areas with adjacent roads of deposited material (e.g., roads of substantially equal width, such as 0.5-2 mm wide).

In one embodiment, the additive toolpaths for a volume include an infill section that provides coverage for the interior of a feature (e.g., following a rectilinear pattern such as spiral, boustrophedon, etc.), followed and/or preceded by one or more (e.g., several, such as 2, 3, 4-6, etc.) perimeters, typically printed concentrically from the infill section outward (e.g., following a path associated with the perimeter of the feature in the oversize part), that cover the remainder of the feature. However, this approach may result in one or more detrimental effects when the toolpaths are implemented (e.g., detriments to the printed layer and/or part). For example, portions of the infill may exhibit higher thickness and/or edge roughness (e.g., as compared with the majority of the printed material), due to abrupt direction changes (e.g., at corners of the rectilinear pattern, at gaps associated with concavities of a non-rectangular feature cross-section, etc.). Subsequent perimeter lines may form voids at these rough interfaces, which can result in poor material properties, especially for multiple consecutive layers that all exhibit such voids in substantially the same lateral position (e.g., at the infill-perimeter junction). Additionally or alternatively, shrinkage of deposited material, such as due to drying of a paste or other deposited material (e.g., due to increased material packing of the dried material), can reduce dimensional precision of the printed slice (e.g., especially due to stack-up of shrinkage from multiple roads, inconsistent shrinkage due to partial drying of some or all deposited material, etc.). Deformation of deposited material (e.g., undried material), such as due to mechanical forces exerted by additional material deposited in contact with the material (e.g., adjacent printed roads of material), can also reduce dimensional precision. However, one or more variations of this embodiment can be implemented, which may alleviate or eliminate such detrimental effects.

In a first variation, one or more subtractive fabrication techniques, such as contouring (e.g., infill sidewall contouring) and/or facing, can be included between infill and perimeter deposition. Such contouring can provide a flat surface abutting the perimeter roads, which can reduce the generation of voids at the infill-perimeter junction. Facing in this manner can enable control of the height of infill turnarounds (e.g. where deposition abruptly changes direction, such as at the edge of a deposited area), which can facilitate perimeter deposition (e.g., by enabling the deposition needle to print a perimeter without hitting raised sections of infill turnarounds).

In a second variation, the position (e.g., relative to the desired exterior surface) of the infill-perimeter junction can be changed for different slices (e.g., alternating between two different junction positions). For example, a first slice can include toolpaths defining an infill-perimeter junction at a standard location (e.g., including 1, 2, or 3 perimeter roads around the infill, etc.), a second slice (e.g., adjacent to the first slice) can define a slightly smaller infill region (e.g., including 1-3 extra perimeter roads as compared with the first slice), a third slice (e.g., adjacent to the second slice) can use the same junction position as the first slice, a fourth slice (e.g., adjacent to the third slice) can use the same junction position as the second slice, and so on.

In a third variation, some deposited material can be dried, preferably fully dried or dried such that substantially all shrinkage has occurred (e.g., using auxiliary toolpaths such as described below, waiting until a threshold drying time interval has elapsed, etc.), before depositing additional (e.g., adjacent and/or contacting) material. For example, an ordered series of toolpaths for printing a set of perimeters can include: a toolpath for printing an inner perimeter, followed by a drying toolpath (e.g., associated with one or more drying tools, such as lamps and/or fans) for drying the material of the inner perimeter, followed by a toolpath for printing an outer perimeter (e.g., defining a portion of the external surface of the expanded part) that contacts the inner perimeter.

A fourth variation includes use of two or more of the variations described above, such as: the use of both subtractive fabrication techniques (e.g., facing and/or infill sidewall contouring) and infill-perimeter junction position alternation. However, detrimental effects can optionally be mitigated in any other suitable manner.

The additive toolpaths can optionally include different deposition parameters, such as deposition parameters determined based on the deposition detail desired for a particular region of the fabricated part. The deposition parameters can include, for example, the nozzle-surface vertical spacing, extrusion ratio (defined as the amount of extruder motion as a function of nozzle-surface travel), and/or any other suitable parameters. In a first example, a large vertical spacing and fast extrusion speed (e.g., high extrusion ratio) is used to achieve high liquid velocity (e.g., and commensurately high shear of the deposited material), which can result in fast settling to the final layer thickness. These conditions can be used to help avoid nozzle collisions with previously-deposited material, and are preferably used for broader area and/or lower-detail features of the fabricated part. In a second example, a small vertical spacing and slow extrusion speed is used to achieve low liquid velocity (e.g., and lower shear flow), which can reduce slumping and/or settling of the deposited material, thereby enabling additive fabrication of finer features (and therefore preferably used for such features). However, the additive toolpaths can additionally or alternatively include any other suitable deposition parameters.

The deposition parameters are preferably changed dynamically throughout each toolpath, more preferably with each parameter independently controllable at any point along the toolpath (e.g., feed rate automatically controlled as a function of road length, road angle with respect to previous and/or next road, whether perimeter or infill is currently being deposited, allowable distance error from ideal toolpath, etc.), but can alternatively be fixed within a single (e.g., and alterable between different) additive road, toolpath, slice, and/or fabricated part. In variations in which the deposition parameters are altered with lower granularity (e.g., fixed for an entire road), the parameters are preferably set to the most conservative values needed to achieve the detail required, but can alternatively be set to less conservative values (e.g., compromising some finer details to achieve a faster print speed) and/or to any other suitable values.

The additive toolpaths can optionally include height adjustments to achieve the desired needle-workpiece vertical spacing (e.g., to maintain constant spacing, to control the spacing such as described above, etc.). In some embodiments, tight control over the vertical spacing can be important to enable excellent control of the material deposition. The height adjustments can be determined, for example, based on calibration information, and are preferably employed to compensate for shifting height corresponding to changes in aspects of the fabrication system, such as lateral positions (e.g., of the workpiece and/or deposition mechanism), temperatures, and/or loads. Such height adjustments can additionally or alternatively be determined during S500 (e.g., as described below in further detail) and/or at any other suitable time.

The additive toolpaths can optionally include (e.g., for small features, such as features defining one or more dimensions smaller than a threshold size) dilating aspects of the feature in the additive toolpath (e.g., to achieve a minimum printed feature size). In such instances, subtractive fabrication techniques (e.g., milling) can be used to achieve the desired feature of the target part. This approach can function to reduce fabrication errors associated with deposition of very small features. The features on which this approach is employed are preferably contained within a single window (e.g., additive and/or subtractive window), but can additionally or alternatively include features that span multiple windows and/or any other suitable features.

The additive toolpaths can optionally include support material toolpaths. The support material associated with the toolpaths can function to, for example: support subsequently deposited features of the part, such as high aspect ratio and/or overhanging features; form molds for subsequently deposited features; and/or protect previously deposited and/or finished surfaces (e.g., surfaces finished by milling). The support material toolpaths preferably correspond to deposition of a support material different from the primary material, but can additionally or alternatively include deposition of the primary material. The support material toolpaths can be followed by the same deposition mechanism used for part deposition and/or a different deposition mechanism.

All or some of S320 (e.g., additive slice determination, additive toolpath generation, etc.) can optionally be performed using standard fused deposition modeling (FDM) software tools (e.g., Slic3r, Prusa, etc.), modified versions thereof, and/or any other suitable software tools. S320 can additionally or alternatively include determining the additive toolpaths in any other suitable manner.

Determining and interspersing subtractive toolpaths S330 preferably functions to generate subtractive toolpaths for fabricating the target part (e.g., from the oversize part or portions thereof, in cooperation with the additive toolpaths, etc.). The subtractive toolpaths can include toolpaths corresponding to internal part surfaces (e.g., interfaces of the final fabricated part, such as the interface between two adjacent additive layers), external part surfaces (e.g., exposed surfaces of the final fabricated part), and/or any other suitable subtractive toolpaths.

Subtractive toolpaths corresponding to internal part surfaces (e.g., toolpaths touching internal part surfaces, such as surfaces that will be encased inside a part by further additive steps) preferably include facing toolpaths (e.g., facing of temporary top surfaces, such as the exposed top surfaces of recently-deposited additive layers). Such facing can function to provide a flat surface for deposition of subsequent additive layers. These facing toolpaths are preferably fast and/or rough, and preferably employ a large cutting tool (end mill, face mill, other facing tool such as a fly cutter, etc.) relative to other subtractive toolpaths, such as external surface finishing toolpaths.

The faced surfaces preferably include the current top of the fabricated piece, such as the top of the most recently deposited additive slice, but can additionally or alternatively include any other suitable surfaces. The faced surfaces are preferably substantially horizontal, but can additionally or alternatively include surfaces of any other suitable orientation.

Every additive layer is preferably faced, but alternatively only a subset of additive layers can be faced (e.g., every set number of layers, such as 2, 3, 4, 5, 6-10, etc.; after a threshold deposition thickness, such as 0.05, 0.1, 0.2, 0.5, 1, or 2 mm, etc.; only when facing is required and/or expected to benefit part fabrication, such as in response to determining that the surface planarity, roughness, and/or error, such as error with respect to a nominal and/or target height, is worse than a threshold value; etc.).

Figure 3A:
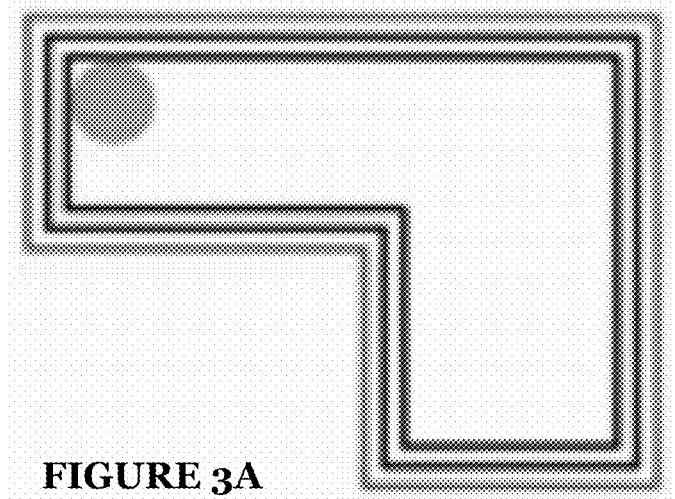
FIGS. 3A-3B depict top views of a planar and non-planar subtractive toolpath, respectively, for an interior surface.
Figure 3B:
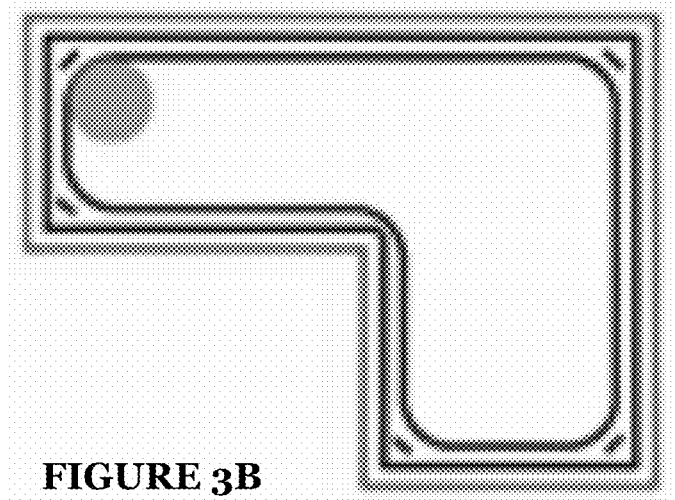

Although referred to as facing toolpaths, a person of skill in the art will recognize that such toolpaths can additionally or alternatively include non-planar machining of the internal surfaces (e.g., to prepare the surface for subsequent deposition). For example, such non-planar surfaces can function to compensate for subsequent deposition of non-uniform thickness. In one embodiment (e.g., in which the deposition mechanism includes a spray tool with a conical focus and a large deposition radius), in which the additive toolpaths produce thinner deposition near the edge of a layer than in the interior of the layer, the machined internal surface can deviate upward from the plane (e.g., curve upward from a substantially horizontal plane) near the edge, thereby compensating for the reduced material deposition at the edge (e.g., as shown in FIG. 3B, such as in contrast to FIG. 3A in which a planar facing toolpath is depicted). This deviation can include a fixed deviation (e.g., curvature) at each edge, can be determined dynamically (e.g., based on the following additive toolpath, such as by modelling the expected layer thickness from the toolpath and determining a profile accordingly, preferably to achieve a substantially flat surface after printing), and/or can be determined in any other suitable manner. However, the subtractive toolpaths can additionally or alternatively include toolpaths for machining the internal surfaces in any other suitable manner.

Subtractive toolpaths corresponding to external part surfaces preferably include finishing toolpaths. Such toolpaths preferably function to efficiently achieve a high quality surface finish in a part with the desired part dimensions (e.g., corresponding to the target part). The toolpaths can additionally or alternatively include roughing toolpaths, but the additive process preferably yields structures (e.g., of the oversize part) that do not require roughing (e.g., for which finishing can be performed directly on the deposited material, without intervening subtractive techniques). Determining and interspersing the external surface toolpaths (e.g., finishing toolpaths) preferably includes: determining one or more cutting tools; determining subtractive volumes; determining additive and subtractive windows; within each subtractive window, grouping potential toolpath segments; for each group, selecting a cutting tool and determining toolpaths; and/or combining the toolpaths.

Determining one or more cutting tools preferably functions to determine a set of cutting tools that can or will be used to perform the subtractive toolpaths (e.g., cutting tools available in a fabrication system, cutting tools to be considered when determining subtractive toolpaths, etc.). The cutting tools can include end mills (e.g., square, radiused, ball end, etc.), keyseat cutters, face mills, fly cutters, and/or any other suitable cutting tools, preferably including multiple sizes (e.g., radiuses, lengths, etc.) of cutting tools. However, the cutting tools can additionally or alternatively include any other suitable tools.

The subtractive volumes (e.g., subtractive slices) are preferably horizontal slices and/or slices parallel to the additive slices, but can alternatively include any other suitable slices and/or other volumes (e.g., volumes such as described above regarding S320). The subtractive volumes can be the same as or different from the additive volumes. The subtractive volumes are preferably a set of volumes that collectively span the entire part and/or the entire surface of the part (e.g., of the target part, oversize part, etc.). The subtractive volumes can be mutually non-overlapping or substantially mutually non-overlapping, can have some overlap (e.g., to provide for smooth transitions between volumes, to ensure full coverage of the fabricated part surfaces by the subtractive toolpaths, etc.). In some embodiments, all or some subtractive volumes can be interleaved into additive volumes (e.g., by employing tool avoidance techniques). The subtractive volumes can optionally be defined based on the cutting tool and/or part geometry (e.g., wherein a subtractive volumes corresponds to a single cutting tool pass of a waterline contour path), but can additionally or alternatively be determined based on any other suitable information.

Determining additive and subtractive windows preferably functions to determine groups for continuous additive and subtractive fabrication (e.g., additive windows without intervening subtractive fabrication, subtractive windows without intervening additive fabrication). The windows are preferably groups of volumes (e.g., additive volumes for additive windows, subtractive volumes for subtractive windows), more preferably adjacent volumes. Determining the windows preferably includes determining a window ordering.

The windows (and ordering thereof) are preferably determined based on one or more of the following criteria. First, a cutting tool (e.g., end mill) can preferably reach all surfaces of a subtractive window (e.g., the surfaces to be milled) without the tool crashing (e.g., into the partially-fabricated part), preferably determined based on the fabrication progress from all windows preceding the subtractive window under consideration. Tool crashes could potentially occur with the top surfaces, sides, and/or any other portions of the part. While machining high-angle regions (e.g., vertical and/or near-vertical side-walls, features beneath overhangs, etc.), small subtractive windows may be selected, undercutting tools (e.g., undercut end mills such as ball end mills, keyseat cutters, etc.) may be used for subtractive milling within the window, and/or any other suitable precautions may be employed (e.g., to avoid tool crashes).

Second, subsequent additive and subtractive windows preferably do not damage portions of the part (e.g., surfaces) that have already been finished. For example, as described above, additive layers are preferably printed with material greater than the target part (e.g., corresponding to the oversize part), which enables subsequent subtractive fabrication to achieve a high-quality surface finish with the target part dimensions. However, material printed on top of (e.g., and overhanging) a surface that has already been finished may drip and/or collapse onto the finished surface, thereby damaging it. Thus, the windows and ordering thereof are preferably determined to avoid such damage.

Figure 4:
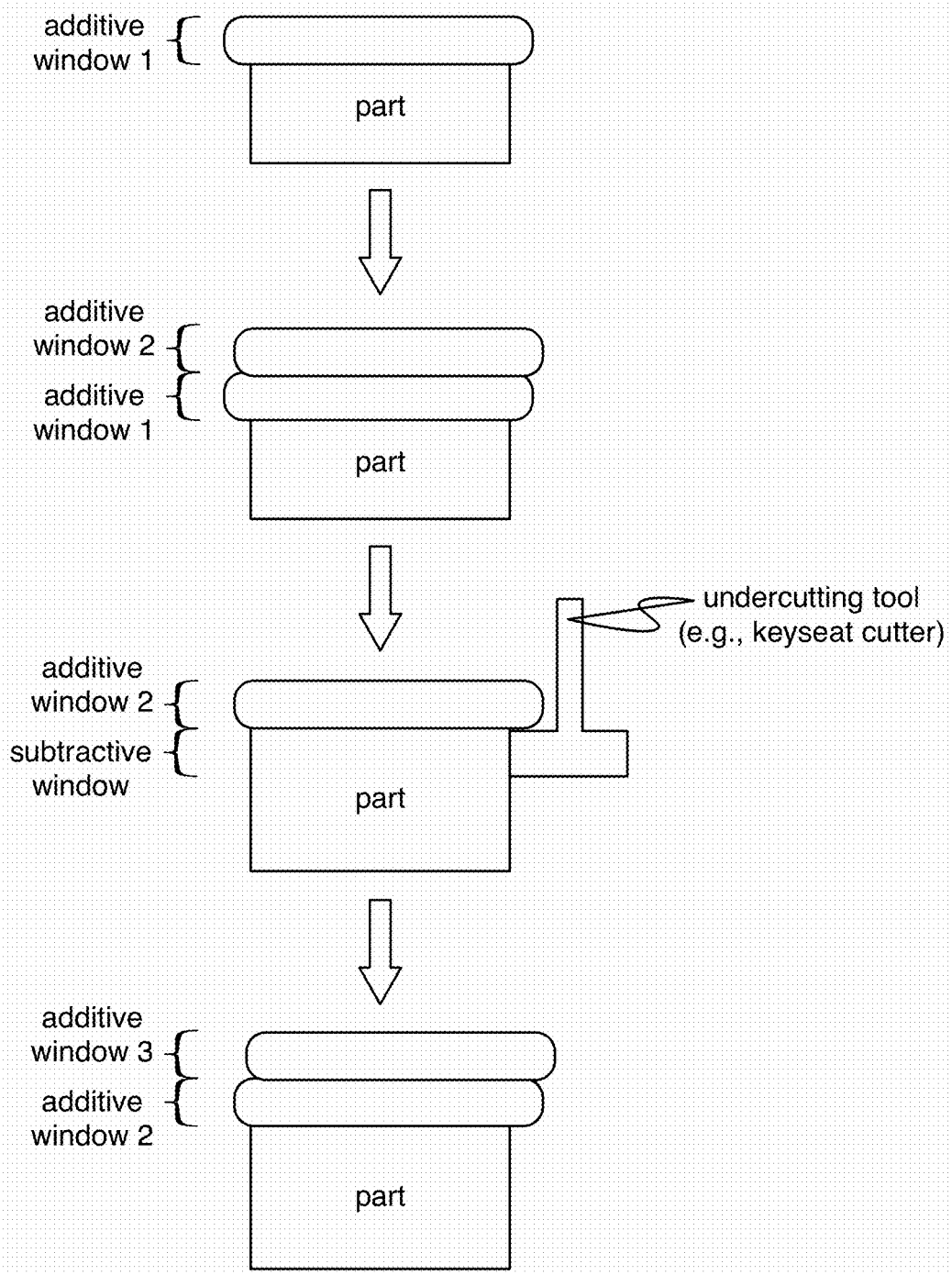
FIG. 4 depicts a side view of a first embodiment of vertical surface fabrication.

In a first variation, a subtractive window in which a set of surfaces are finished is preferably not scheduled before an additive window that includes printing onto (and/or adjacent to, such as close enough that printed material may spread onto) any of the surfaces of the set (e.g., thereby avoiding printing onto finished surfaces). In one example (e.g., in which the target part includes a tall vertical or near-vertical surface, such as a surface taller than the cutting region length of the longest cutting tool available for use finishing the surface), the surface can be fabricated over a series of alternating additive and subtractive windows, including (e.g., as shown in FIG. 4): in a first additive window, depositing a first set of layers; in a first subtractive window, using an undercutting tool to finish the vertical surface portion of the first set of layers, except for a top portion (e.g., the top layer or layers, a top fraction of the top layer, etc.); in a second additive window, depositing a second set of layers on top of the top portion (e.g., wherein the layers are deposited onto the unfinished surface, but not onto the finished surface below); in a second subtractive window, using an undercutting tool (e.g., the same undercutting tool, a different tool, etc.) to finish the vertical surface portion of the second set of layers (along with the unfinished portion of the first set of layers); and so on, until a final subtractive window, in which the entire remaining unfinished vertical surface is preferably finished (e.g., using a standard, non-undercutting tool; using the undercutting tool; etc.).

Figure 5A:
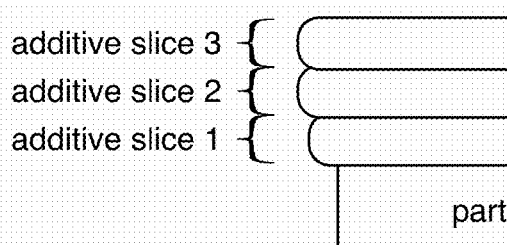
FIGS. 5A-5C depict side views of a second embodiment of vertical surface fabrication, before, during, and after performance of a subtractive fabrication window, respectively.
Figure 5B:
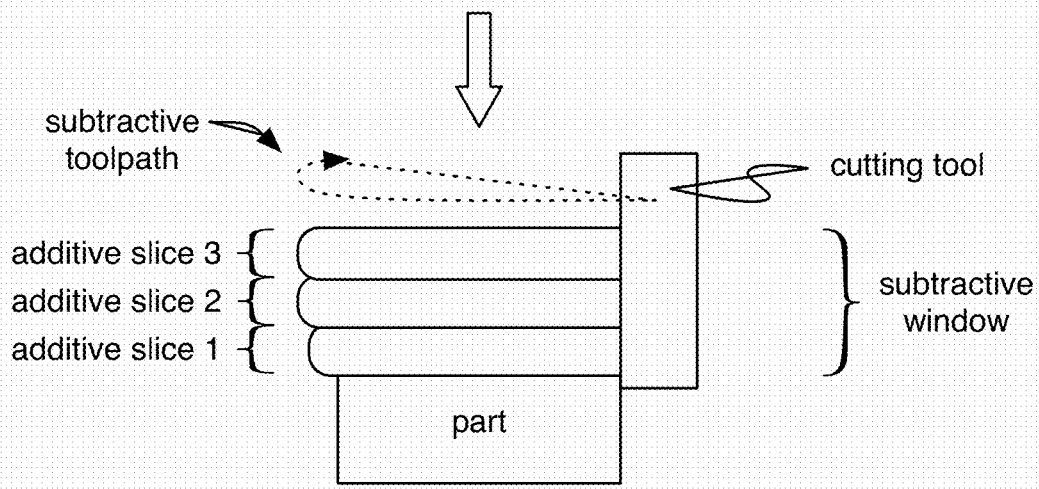
Figure 5C:
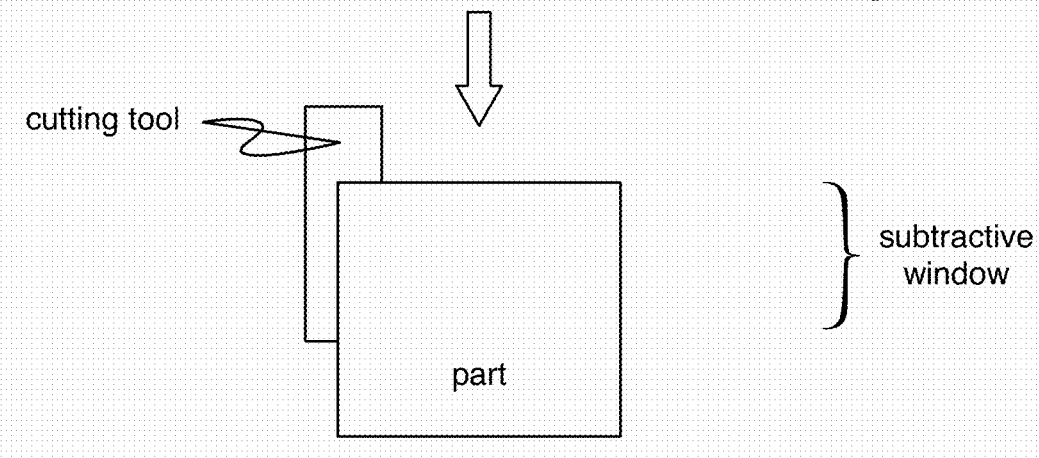

In a second variation, overhang control is preferably employed for additive fabrication onto and/or adjacent to finished surfaces. To achieve such control when depositing overhanging layers onto already-finished surfaces, each subsequent layer within the additive window can overfill (e.g., overhang the finished surface, exceed the target part dimensions, etc.) by an increasing amount (e.g., up to a maximum overfill), thereby creating a controlled overhang above the finished surface. In one example (e.g., as shown in FIGS. 5A-5C), the first deposited layer of the additive window can overhang by a first amount (e.g., less than the amount dictated by the oversize part but greater than that dictated by the target part), such as 10-25, 10-50, or 10-100 µm, and all subsequent deposited layers of the additive window can overhang by a second amount (e.g., as dictated by the oversize part), such as 25-50, 25-100, or 25-150 µm. In this example, all the overhanging layers can then be finished in a single subtractive window, and additional overhanging layers can then be deposited on top of them (e.g., using overhang control, such as described in this example) and subsequently finished. Additionally or alternatively, printing velocity can be reduced when depositing onto and/or adjacent to the finished surfaces, which can reduce the risk of deposited material spreading onto and/or damaging the finished surfaces. However, damage to finished surfaces can additionally or alternatively be mitigated and/or prevented in any other suitable manner.

Third, the additive windows are preferably as large as possible (e.g., the most slices possible, the greatest height possible, etc.) without violating the first and second criteria. However, the additive and/or subtractive windows and their ordering can additionally or alternatively be determined in any other suitable manner.

Within each subtractive window, the potential toolpath segments (e.g., a single tool pass along a surface, a single surface portion of a volume, etc.) are preferably grouped by surface. This grouping preferably functions to determine toolpath groups (e.g., which can optionally be treated as indivisible units for subsequent toolpath determination). Each potential toolpath segment does not necessarily correspond to a segment of a real toolpath, but can additionally or alternatively refer to any suitable portion of one or more surfaces.

In some embodiments, the subtractive volumes and/or windows can be determined based on such surfaces (e.g., based on the shape, size, location, and/or any other suitable characteristics of the surfaces). In one such embodiment, the part to be fabricated defines multiple surfaces (and/or surface features) at overlapping (e.g., staggered) heights (e.g., along a part orientation vector defined normal to a horizontal plane, normal to a support and/or deposition plane of the part, etc.), such as shown by way of example in FIG. 6A. For such a part, if the subtractive volumes and/or windows were defined by parallel planar slices (e.g., horizontal slices), they would either separate one or more such surfaces across multiple volumes (which may be detrimental for part fabrication quality, subtractive machining efficiency, etc.), or a single subtractive volume would encompass all the surfaces of overlapping heights (which may not be feasible, may not enable a high-efficiency set of toolpaths, etc.). In contrast, by defining subtractive volumes and/or windows using non-parallel and/or non-planar boundaries, the surfaces can be each contained within single volumes and/or windows of a feasible size (e.g., as shown in FIG. 6C). Thus, subtractive machining for each surface (or a subset thereof) can be performed in a single window associated with the surface. Preferably, the toolpaths determined in this manner result in, for each feature associated with (e.g., defining) one of these surfaces, depositing the entire feature (via the additive toolpaths) before machining the surface associated with the feature (via the subtractive toolpaths), such as shown byway of example in FIGS. 6B-6C.

Determining the toolpath groups preferably includes classifying the potential toolpath segments by surface type. Such surface types can include, for example: surfaces indicated (e.g., in the received virtual part) as unimportant (e.g., surfaces for which poor tolerances and/or surface finish are acceptable); surfaces under an overhang (e.g., considering features present at the time the current window is executed, based on the ordering of windows as described above; not considering features deposited in subsequent windows); horizontal surfaces; and/or all other surfaces.

Some or all surfaces (e.g., expansive surfaces, such as surfaces greater than a threshold area, or greater than a threshold fraction of the total surface area; surfaces with highly non-uniform feature complexity and/or size; etc.) can optionally be further separated into sub-surfaces. For example, a surface can be separated such that each sub-surface group is optimal and/or acceptable for subtractive fabrication using a single cutting tool (e.g., determined based on feature size, surface gradient, etc.).

Some (or all) toolpath groups can optionally extend across windows (e.g., segments of the same multi-window-spanning surface can be combined and treated as if they are all part of the same window). For example, a vertical surface (or, for a fabrication system with more than 3-axis control, any other suitable flat surface, such as a surface that can be oriented parallel to the cutting tool) can be grouped across subtractive windows, such as by deferring lower segments of the surface to later (higher) windows. In this example, a single finishing pass (e.g., with a long cutting tool) can be used to finish all the surface segments together, rather than using a separate pass (e.g., with a shorter cutting tool) for each segment. However, the toolpath groups can additionally or alternatively be determined in any other suitable manner.

A cutting tool is preferably selected for each toolpath group (e.g., each toolpath group within the subtractive window). The cutting tool is preferably selected based on one or more of the following criteria. First, the largest available tool that can achieve an acceptable result (e.g., acceptable surface finish; minimal deviation from specified dimensions, such as deviation below a threshold value; etc.) is preferably selected for a toolpath group. Second, the number of and/or time spent performing tool changes is preferably minimized. When these criteria conflict, one can be prioritized over the other, or an optimal balance between the two (e.g., based on an objective function) can be used. For example, the total time required to execute all the toolpaths of a subtractive window (e.g., including machining time, such as determined based on the acceptable feed rate and path length for the selected tool(s); tool change time; auxiliary toolpath time; etc.) can be minimized. Cutting tool selection can additionally or alternatively include attempting to reduce (e.g., minimize) the total number of tools used (e.g., for a part or set of parts), which can reduce the complexity of the fabrication system required to perform the method, and/or attempting to optimize any other suitable parameters.

For toolpath groups classified based on surface type, the classifications can be used to determine or help determine the cutting tool selection. In one embodiment, cutting tools can be selected based on toolpath group classifications as described below.

Unimportant groups can be ignored (e.g., no cutting tool selected, no subtractive toolpaths included). Surfaces under an overhang can be ignored (e.g., if the fabrication system is incapable of machining them as desired), or can be associated with an undercutting tool (e.g., keyseat cutter, ball end mill with a ball end greater than a hemisphere, such as a 270° ball end, etc.). In one example, lower surfaces under an overhang are contoured (e.g., by an undercutting tool), and higher surfaces (e.g., unreachable by the undercutting tool due to diminishing size of a horizontal aperture into the region of the surfaces following printing of additional overhanging layers) are ignored. Horizontal surfaces are preferably associated with a facing tool (e.g., square or square radiused end mill, face mill, fly cutter, etc.), more preferably a large diameter facing tool. Vertical surfaces are preferably associated with a long (and/or large diameter) milling tool, especially if the group spans multiple subtractive windows. In examples in which a vertical surface intersects a horizontal surface (e.g., with no fillet at the intersection), the vertical surface can be associated with a square endmill, wherein milling of the vertical surface and horizontal surface (e.g., near the intersection with the vertical surface) can optionally be performed (e.g., concurrently) by the same square endmill.

All other surfaces (e.g., surfaces requiring 3D contouring) are preferably associated with a ball end mill (e.g., hemispherical ball end mill). These surfaces are preferably associated with the largest tool compatible with the features required. In one example, tool compatibility is determined by determining (e.g., computing) the error between the generated toolpath (e.g., determined as described below) required for the tool and the desired edge of a slice. If the error exceeds a threshold value, a smaller tool is preferably selected (e.g., computing the error associated with tools in order of descending diameter, stopping once a tool that achieves acceptable error is found).

Based on the tool selections, an execution order for the toolpath groups can be determined, preferably such that tool changes and/or total execution time is minimized. However, the cutting tools and/or toolpath group ordering can additionally or alternatively be determined in any other suitable manner.

Toolpaths are preferably determined for each toolpath group within the subtractive window (e.g., following and/or concurrent with selection of the cutting tools). Determining the toolpaths preferably includes determining the feed and/or speed based on: the selected cutting tool, the desired finish quality, the structure fragility (e.g., reducing the feed rate near fragile features, such as high aspect ratio feature, sharp corners and/or edges, etc.), and/or any other suitable information.

For horizontal surfaces, the toolpath is preferably a facing toolpath beginning at the perimeter of the surface and spiraling inward, but can additionally or alternatively include any suitable facing toolpath. For vertical surfaces, the toolpath is preferably a side milling toolpath, more preferably one in which the surface is milled in a single pass. For other surfaces, the toolpaths can include waterline contour toolpaths, preferably beginning at the top, but alternatively beginning at the bottom or any other suitable height; drop cutting toolpaths (e.g., toolpaths in which either of the lateral axes, such as the X or Y axis, is held constant while the other lateral axis and the vertical axis, such as the Z axis, are varied to define the desired topography, such as to follow a given surface; toolpaths in which the tool follows a predetermined lateral pattern, such as a rectilinear spiral or boustrophedon, while the vertical axis is varied to define the desired topography; copy milling toolpaths; etc.); and/or any other suitable toolpaths. In a first example, all such surfaces are milled using waterline contour toolpaths. In a second example, all such surfaces are milled using drop cutting toolpaths. In a third example, surfaces with sufficiently shallow gradients (e.g., below a threshold value) are milled using drop cutting toolpaths, and all other surfaces are milled using waterline contour toolpaths.

Some or all surfaces can optionally be reoriented and treated accordingly (e.g., when using a fabrication system with more than 3 axes of control, when employing manual part reorientation and refixturing, etc.). Such reorientation can function to enable more efficient machining techniques (e.g., facing using a large-diameter facing tool), to enable use of a smaller total number of windows and/or tool changes, to enable cutting tool access to part regions that would otherwise be difficult and/or impossible to reach (e.g., under overhangs), and/or can have any other suitable function(s). In one example, a planar surface can be reoriented to a horizontal orientation and then be faced, or can be reoriented to a vertical orientation and then be side milled.

Determining the toolpaths (and/or any other suitable portions of the method) can optionally include converting linear motions into arcuate motions. For example, converting linear motions into arcuate motions can include: recognizing that a series of points connected by linear segments corresponds to a desired arc in the part (e.g., based on a mathematical condition, such as that the angles between a threshold number of sequential segments define a second derivative within a threshold amount of each other); determining a smooth arcuate motion that fits the series of points; and replacing the linear motions with the arcuate motion.

The subtractive toolpaths can optionally include toolpaths for machining support material. Such support material machining toolpaths can optionally include finishing the support material surfaces (e.g., as described above regarding finishing), which can improve the quality (e.g., surface finish) of material (e.g., primary material) deposited onto the support material. Such machining can additionally or alternatively include defining molds for subsequent deposition (e.g., of primary material). These molds can, for example, facilitate deposition of fragile features, such as tall and/or thin features (e.g., without the need for subsequent machining to define the features, in situations where the desired features are too fragile for reliable machining, etc.), and/or can enable patterning (e.g., embossing and/or reverse embossing, etc.) of subsequently deposited materials.

The toolpaths preferably allow for drying of deposited materials (e.g., such that only dried material is milled), such as by imposing a delay time between material deposition and subsequent milling. Alternatively, the toolpaths can neglect to account for material drying, can intentionally include milling undried material, and/or can handle deposited material drying in any other suitable manner. Drying the material can optionally include a prescribed wait time, a thermal cycle, and/or a mass transfer. In one example, drying the material includes a pattern including all three (e.g. wait, heat, blow air, wait, cool). A goal of drying the material can be to remove one or more components from the deposited material, such that material changes from soft to hard, enabling facile machining while the material substantially retains its shape (e.g., within 0.001"). In some embodiments, drying the material causes the layer thickness to decrease (e.g., due to increased material packing of the dried material).

All or some of S330 (e.g., subtractive toolpath generation) can optionally be performed using standard CAM software tools (e.g., Freesteel, MasterCAM, CAMWorks, etc.), modified versions thereof, and/or any other suitable software tools. S330 can additionally or alternatively include determining and/or interspersing the subtractive toolpaths in any other suitable manner.

S300 can optionally include determining and interspersing auxiliary toolpaths S340. Such auxiliary toolpaths can include, for example: drying and/or curing toolpaths (e.g., for drying actuators such as lamps and/or blowers; for sensors such as temperature and/or solvent sensors; etc.); tool maintenance toolpaths, such as tip cleaning, tool changing, and/or tool setting (e.g., automatic checking of nozzle-mill offsets, such as in the vertical direction and/or any other suitable directions); dust and/or debris removal toolpaths (e.g., employing a vacuum shroud, such as described above regarding the system); workpiece inspection toolpaths; temperature measurement and/or mapping toolpaths; toolpaths enabling comparison (e.g., optical comparison) to the oversize part, target part, and/or other virtual part; compaction toolpaths (e.g., including application of compaction pressure to the workpiece); and/or any other suitable toolpaths.

The drying and/or curing toolpaths can follow the deposition mechanism path, can move along a slow axis of a boustrophedonic deposition mechanism path, and/or can include any other suitable path. The drying and/or curing toolpaths can optionally include closed-loop controls, wherein drying actuator toolpaths can be modified (e.g., movement rates and/or dwell times changed, waypoints added and/or removed, etc.) in response to measurements sampled by the sensors. The dust and/or debris removal toolpaths can include, for example: following the cutting tool; activating a vacuum while the cutting tool is in use and/or deactivating the vacuum at other times; moving the shroud away from the cutting tool (e.g., opening up the shroud) in preparation for tool changes, then moving the shroud back toward the new tool after the change; and/or any other suitable toolpaths. The workpiece inspection toolpaths can include, for example, controlling one or more sensors (e.g., surface quality sensors) to sample measurements of the workpiece, and optionally automatically correcting defects (e.g., surface voids) detected by the sensors (e.g., depositing material into the void, allowing the material to dry, and then machining the deposited material to achieve the desired dimensions and/or surface finish; resetting the layer by removing the defective layer (or a portion thereof), such as by facing, and then re-fabricating the removed portion, such as by repeating the additive and/or subtractive toolpaths associated with the layer; etc.). However, S340 can additionally or alternatively include determining any other suitable auxiliary toolpaths in any suitable manner.

The determined toolpaths (e.g., from all the windows) are preferably combined into a combined toolpath. The combined toolpath preferably includes the internal surface toolpaths (e.g., facing toolpaths), the finishing toolpaths, the additive toolpaths, and any other suitable toolpaths. The toolpaths are preferably combined based on the windows, the toolpath groups, the toolpath group ordering, and/or the determined toolpaths themselves, but can additionally or alternatively be combined based on any other suitable information. However, S300 can additionally or alternatively include determining any other suitable toolpaths in any suitable manner.

4.4 Generating Machine Instructions.

Generating machine instructions based on the toolpaths S400 preferably functions to generate instructions that can be executed by the fabrication system (e.g., resulting in fabrication of the target part). S400 can be part of and/or performed concurrently with S300 (e.g., wherein the toolpaths are directly generated as G-Code representations and/or other machine instructions), performed after (e.g., in response to) performance of S300 (e.g., generating machine instructions, such as G-Code, based on the toolpaths determined in S300), and/or performed with any other suitable timing. However, the machine instructions can additionally or alternatively be generated in any other suitable manner.

4.5 Fabricating the Part.

Fabricating the target part based on the machine instructions S500 preferably includes controlling the fabrication system based on the instructions. For example, S500 preferably includes providing the machine instructions to the fabrication system. S500 is preferably performed following S400 (e.g., in response to S400; after S400 and in response to a trigger, such as a part fabrication request; etc.) but can additionally or alternatively be performed with any other suitable timing. S500 can include fabricating one or more copies of the target part using one or more fabrication systems.

S500 can optionally include adjusting fabrication system operation based on calibration information (e.g., information determined in S600, etc.) and/or sensor measurements. For example, the vertical and/or lateral position of the deposition mechanism and/or cutting tool (e.g., relative to the workpiece) can be altered based on the calibration information and/or sensor measurements (e.g., to compensate for undesired changes arising from fabrication system imperfections). The sensor measurements can include measurements associated with fabrication system state (e.g., information associated with the calibration information, such as temperatures, loads, forces, etc.; direct calibration measurements, such as laser measurement devices and/or other sensors monitoring the position of anchor points of the fabrication system, paste deposition measurements, such as weight and/or visual measurements; etc.), part state (e.g., part quality inspection, such as described above), and/or any other suitable information. However, S500 can additionally or alternatively include fabricating the target part in any other suitable manner.

4.6 Calibrating the Fabrication System.

Calibrating the fabrication system S600 preferably functions to determine calibration information associated with the fabrication system. The calibration information can include, for example, actual positions of and/or distances between elements of the fabrication system under a variety of conditions, such as different temperatures, loads, forces, controlled element positions (e.g., nominal positions, positions measured by sensors such as encoders, etc.), and/or any other suitable parameters. S600 is preferably performed before S500 (e.g., upon initial fabrication system commissioning), but can additionally or alternatively be performed substantially concurrent with S500 and/or with any other suitable timing.

In one example, calibrating the fabrication system S600 includes measuring known flat surfaces (e.g., granite blocks, thin precision metal plates, etc.), such as using contact and/or non-contact metrology tools, over a representative set of machine states (e.g., temperatures, loads, forces, controlled positions, etc.) to determine the compensation information. During part fabrication, the measured calibration information can be interpolated (and/or extrapolated) to determine calibration information for the actual (e.g., measured) fabrication system conditions. However, S600 can additionally or alternatively include calibrating the fabrication system in any other suitable manner, and the method can additionally or alternatively include any other suitable method elements.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for facilitating part fabrication, comprising, based on a virtual part model:
   receiving a virtual part model associated with a part;
   determining a set of additive windows and a set of subtractive windows based on the virtual part model; and
   determining an ordered series of toolpaths, the ordered series comprising:
      a first perimeter toolpath set comprising:
         a first additive toolpath for depositing a first layer of a part, the first layer defining a perimeter of a slice of the part; and
         a first subtractive toolpath for removing a first portion of the first layer;
      after the first perimeter toolpath set, a second toolpath set comprising:
         a second additive toolpath for depositing a second layer of the slice of the part on the first layer of the part; and
      an infill toolpath set comprising:
         a third additive toolpath for depositing an infill volume in the space defined inside the first and the second layers; and
         a second subtractive toolpath for removing a second portion of the second layer and the infill volume;
   wherein an additive window of the set of additive windows comprises the first additive toolpath and the second additive toolpath, wherein the additive toolpath is associated with an additive volume confined within the additive window; and wherein a subtractive window of the set of subtractive windows comprises the subtractive toolpath, wherein the subtractive toolpath is associated with a subtractive volume confined within the subtractive window.

2. The method of claim 1, wherein the first perimeter toolpath further comprises a first drying toolpath for drying the first layer of the part before the first subtractive toolpath.

3. The method of claim 2, wherein the infill toolpath further comprises a second drying toolpath for drying at least one of the second layer of the part or the infill volume before the second subtractive toolpath.

4. The method of claim 1, wherein a height of the first layer of the part is less than a target height of the slice, wherein a combined height of the first layer and the second layer is at least the target height of the slice.

5. The method of claim 4, wherein the height of the first layer is about half of the target height.

6. The method of claim 1, wherein a width of the first layer is between 0.5 and 2 mm wide and a height of the first layer is between 0.05 and 0.5 mm.

7. The method of claim 6, wherein a width of the second layer is between 0.5 and 2 mm wide and a height of the second layer is between 0.05 and 0.5 mm.

8. The method of claim 1, wherein the first subtractive toolpath comprises a facing toolpath for facing a first surface of the first layer.

9. The method of claim 8, wherein the second subtractive toolpath comprises a second facing toolpath for facing a second surface of the second layer and the infill volume.

10. The method of claim 8, wherein the first surface is non-planar.

11. The method of claim 1, further comprising scaling the virtual part model to form a scaled part model, wherein the scaled part model is larger than the virtual part model by a predetermined amount to compensate for fabricated part shrinkage during post-part fabrication processing; wherein the ordered series of toolpaths are determined from the scaled part model.

12. The method of claim 11, wherein the scaled part model is scaled anisotropically.

13. The method of claim 1, wherein the third additive toolpath substantially defines a rectilinear pattern.

14. A method for facilitating part fabrication, comprising:
receiving a virtual part model associated with a part;
determining a set of additive windows and a set of subtractive windows based on the virtual part model;
determining an ordered series of toolpaths for fabricating the part based on the virtual part model, the ordered series of toolpaths comprising:
a first additive toolpath for depositing a first layer of the part, the first layer defining a first perimeter of the part;
a second additive toolpath for depositing a second layer of the part, wherein the second layer comprises a second perimeter subpath defining a second perimeter of the part and an infill subpath filling a volume within the first perimeter or the second perimeter of the part; and
a subtractive toolpath for removing a portion of at least one of the first layer or the second layer;
wherein an additive window of the set of additive windows comprises the first additive toolpath and the second additive toolpath, wherein the additive toolpath is associated with an additive volume confined within the additive window; and
wherein a subtractive window of the set of subtractive windows comprises the subtractive toolpath, wherein the subtractive toolpath is associated with a subtractive volume confined within the subtractive window.

15. The method of claim 14, wherein the second perimeter is above the first perimeter.

16. The method of claim 14, further comprising determining an oversized part model by scaling the virtual part model by an amount between 5% and 75% of a dimension of the part, wherein the ordered series of toolpaths is determined using the oversized part model.

17. The method of claim 16, wherein:
a difference between the oversized part model and the virtual part model defines a subtractive portion; and
the portion is defined by the intersection of the subtractive portion, the additive window, and the subtractive window.

18. The method of claim 14, wherein the infill subpath defines a spiral path or boustrophedon path.

19. The method of claim 14, wherein a height of the first layer of the part is less than a target height of the additive volume, wherein a combined height of the first layer and the second layer is at least the target height of the additive volume.

* * * * *